Patented May 29, 1951

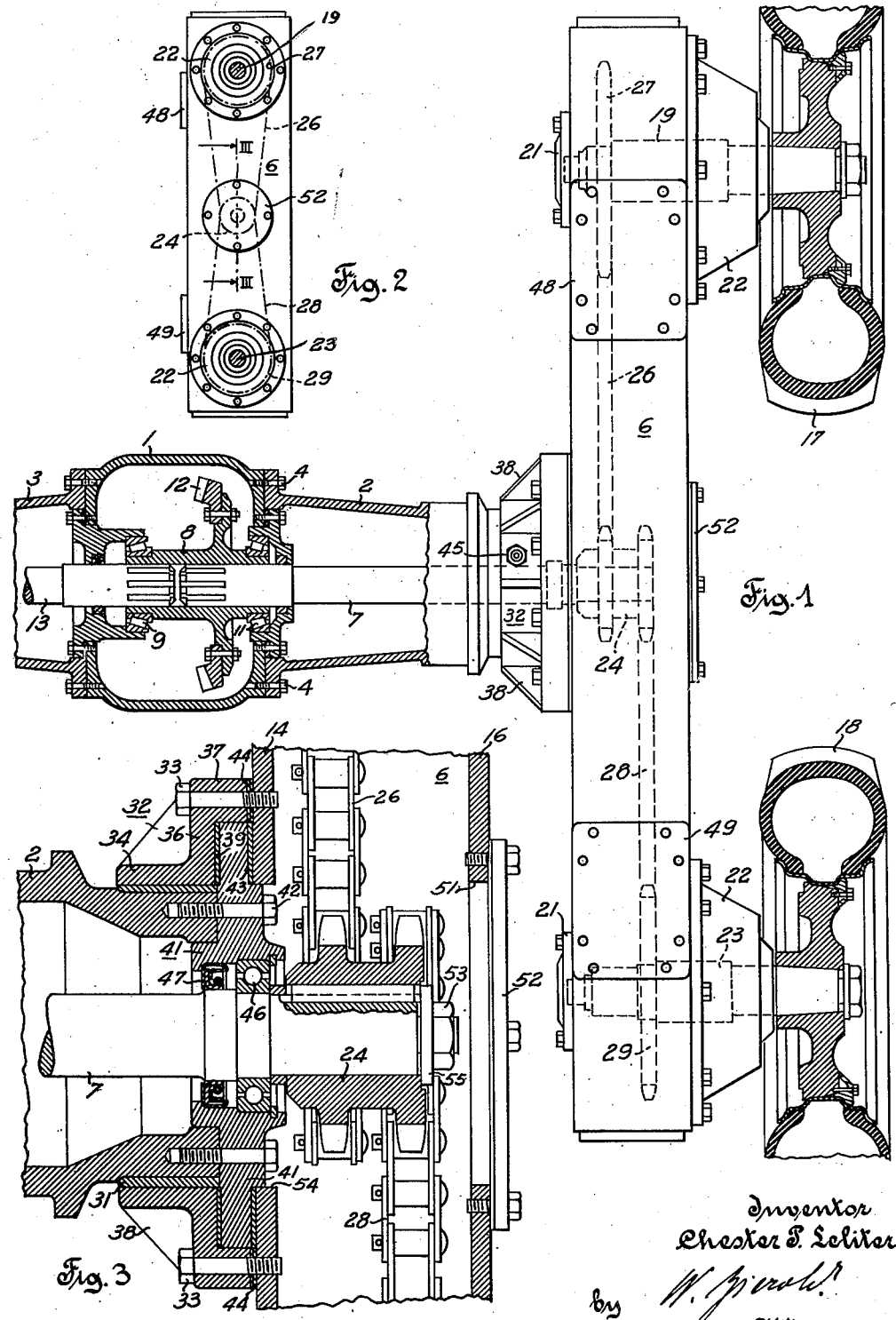

2,554,785

UNITED STATES PATENT OFFICE 2,554,785

DETACHABLE MOUNTING MEANS FOR WHEEL SUPPORTED SWING FRAMES

Chester P. Leliter, Springfield, Ill., assignor to Allis-Chalmers Manufacturing Company, Milwaukee, Wis., a corporation of Delaware Application December 7, 1948, Serial No. 63,928

8 Claims. (Cl. 180—22)

The invention relates to motor vehicles, and it is concerned more particularly with an improved mounting of a wheel supported swing frame on the vehicle body.

Wheel supported swing frames are commonly used in heavy duty motor vehicles for sustaining the vehicle body at its opposite sides, and the mounting of such swing frames presents various problems, particularly in the matter of stabilizing them against toeing in and out, and against lateral tilting, as is well known in the art.

Generally, it is an object of the invention to provide an improved mounting of a wheel supported swing frame on the axle housing of a motor vehicle.

More specifically, it is an object of the invention to provide an improved connection between a swing frame and the axle housing of a motor vehicle, which will be simple, cheap and compact, and yet meet the requirement for proper stabilization of the swing frame against toeing in and out and against lateral tilting, in a fully satisfactory manner.

A further object of the invention is to provide an improved swing frame mounting which lends itself for use in motor vehicles, such as motor graders, in which a pair of propelling wheels are mounted on a hollow swing frame in tandem relation to each other, and in which the mechanism for transmitting power to the propelling wheels includes a drive shaft which extends from the axle housing in the axial direction of the latter, and a gear wheel, such as a chain sprocket, which is mounted on said drive shaft and located within the hollow swing frame.

A further object of the invention is to provide an improved mounting for a hollow swing frame of the hereinbefore mentioned character, which permits ready installation of the swing frame on the axle housing after the mentioned drive shaft and gear wheel have been installed on the axle housing, and which similarly permits ready removal of the swing frame from the axle housing while the drive shaft and gear wheel remain operatively installed on the axle housing; and which further permits ready installation of the drive shaft and gear wheel on the axle housing prior to the installation of the swing frame on the axle housing, and ready removal of the drive shaft and gear wheel, if desired; the arrangement being preferably such that at least the gear wheel can be removed for purposes of inspection and replacement, if necessary, while the swing frame remains operatively installed on the axle housing.

The foregoing and other objects and advantages are attained by the present invention various novel features of which will be apparent from the description herein and the accompanying drawing, disclosing an embodiment of the invention, and will be more particularly pointed out in the appended claims.

Referring to the drawings:

Fig. 1 is a top view, partly in section, of an axle housing and swing frame assembly for a heavy duty motor vehicle such, for instance, as a motor grader;

Fig. 2 is a view, on a reduced scale, of the wheel side of the assembly shown in Fig. 1, the supporting wheels for the swing frame which are shown in section in Fig. 1, being omitted in Fig. 2 for purposes of exposure; and Fig. 3 is a sectional view, on an enlarged scale, of part of the assembly shown in Fig. 1, the sectional view of Fig. 3 being taken on line III—III of Fig. 2.

Referring to Fig. 1, a central casing 1, and right and left hollow side arms 2 and 3 are rigidly secured together in conventional manner to form an axle housing, such as the rear axle housing of a motor grader which is not shown in its entirety but which, in conformity with commonly accepted practice, may include a rearward tractor unit, a forward grader unit, and a pair of steerable front wheels at the forward end of the grader unit. The hollow side arm 2 of the rear axle housing is bolted, at its axially inner end to the central casing 1 by a circumferential series of bolts 4 and has an axially outer end on which a wheel supported swing frame 6 is rockably mounted, as will be described more fully hereinbelow with reference to Fig. 3. The hollow side arm 3 is a duplicate of the side arm 2 and similarly mounts a rockable wheel supported swing frame, not shown, which is a duplicate of the swing frame 6 shown in Fig. 1.

A drive shaft 7 which extends through the hollow side arm 2 has a splined axially inner end within a quill shaft 8 which is rotatably mounted in the casing 1 by means of roller bearings 9 and 11. The quill shaft 8 mounts a bevel ring gear 12 to which driving power may be transmitted in conformity with conventional motor vehicle practice. Another drive shaft 13 which is a duplicate of the drive shaft 7 is spline connected at its axially inner end with the quill shaft 8 and extends axially outwardly through the hollow side arm 3. The drive shaft 7 forms part of a power transmitting mechanism through which a pair of ground engaging wheels on the swing frame 6 may be driven, as will be described in greater detail hereinbelow, and the drive shaft 13 forms part of a similar power transmitting mechanism for driving a corresponding pair of ground engaging wheels on the opposite swing frame, not shown.

The swing frame 6, shown at the right of Fig. 1, is constructed in the form of a substantially rectangular plate metal casing and comprises a substantially rectangular plate 14 (Fig. 3) which forms an axially inner side wall of the casing, and another substantially rectangular plate 16 (Fig. 3) which forms an axially outer side of the swing frame casing. A pair of ground engaging tandem wheels 17 and 18 are mounted on the swing frame 6 in conventional manner, the supporting shaft 19 for the wheel 17 at one end of the casing being journaled in a cap member 21 which is bolted to the axially inner side plate 14 of the casing, and the shaft 19 being rotatably supported at the axially inner side of the wheel 17 in a cone shaped bearing retainer 22 which is bolted to the axially outer side plate 16 of the swing frame casing. The wheel 18 is mounted on a shaft 23 which is rotatably supported at the other end of the swing frame casing in the same manner as has been explained hereinbefore in connection with the shaft 19.

A mechanism for transmitting driving power from the drive shaft 7 to the wheels 17 and 18 comprises a gear wheel 24 in the form of a double sprocket which is secured to the axially outer end of the drive shaft 7, as best shown in Fig. 3; roller chains 26 and 28; and sprocket wheels 27 and 29. The roller chain 26 cooperates with an axially inner set of sprocket teeth of the double sprocket 24 and with the sprocket wheel 27 which is secured to the shaft 19 within the hollow swing frame 6. The other sprocket chain 28 cooperates with an axially outer set of sprocket teeth of the double sprocket 24 and with the sprocket wheel 29 which is secured to the axle shaft 23 within the hollow swing frame 6.

Referring to Fig. 3, a cylindrical bearing bushing 31 is press fitted upon a reduced portion of the axle housing at the axially outer end of the hollow side arm 2, and the swing frame 6 is rockably supported on the bushing 31 for vertical swinging movement about the axis of the side arm 2 by means of a bearing hub which is generally designated by the reference character 32 and which is detachably secured to the side wall 14 of the swing frame by means of a circumferential series of cap screws 33. The bearing hub 32 comprises a sleeve member 34 which is journaled on the bearing bushing 31, and a flange member 36 which is connected with and extends from the sleeve member 34 in a radially outward direction at the axially outer end of the latter. A peripheral portion 37 of the flange member 36 extends axially toward the swing frame 6 and has a circumferential series of holes for the reception of the cap screws 33. The sleeve member 34 and the flange member 36 of the bearing hub 32 are braced externally by a circumferential series of webs 38, as best shown in Fig. 1.

The flange member 36 of the bearing hub 32 is abuttable at its axially outer side with a metallic thrust washer 39 which in turn is abuttable at its axially outer side with a disk member generally designated by the reference character 41. The disk member 41 has a radially inner portion which is detachably secured in axially separable relation to the outer end of the axle housing by means of a circumferential series of cap screws 42, and a flat marginal portion of the disk member extends in a radially outward direction from the axle housing at the axially outer end of the side arm 2. The disk member 41 is abuttable at its axially outer side by another metallic thrust washer 43, and the thrust washer 43 in turn is abuttable at its axially outer side with a portion of the side wall 14 of the swing frame casing 6 at the axially inner side of the latter. The thrust washers 39 and 43 are arranged in rotatively loose relation to the bearing hub 32 and to the side plate 14 of the swing frame, respectively, and they are also rotatable relative to the disk member 41. The axially inner and outer sides of the thrust washers are preferably greased at assembly, and when the swing frame 6 rocks about the bearing sleeve 31 during operation of the vehicle, the thrust washers 39 and 43 may rotate relative to the disk member 41, the side plate 14 may rotate relative to the thrust washer 43, and the flange portion 36 may rotate relative to the thrust washer 39. A grease fitting 45, indicated in Fig. 1, is mounted on the sleeve member 34 of the bearing element 32 for lubricating the cylindrical cooperating bearing surfaces of the bushing 31 and of the sleeve 34.

The axial distance between the relatively opposed surfaces of the flange member 36 and of the side plate 14 of the swing frame is properly adjusted by means of shims 44 between the peripheral portion 37 of the bearing hub 32 and the side wall 14 of the swing frame 6, so as to substantially eliminate all axial play between the swing frame and the axle housing. A ball bearing 46 is mounted in the radially inner portion of the disk member 41 and cooperates with the shaft 7 to connect the latter in rotatably supported relation with the disk member 41. At the axially inner side of the ball bearing 46, an oil seal 47 is operatively interposed between the disk member 41 and the drive shaft 7.

The bearing bushing 31 and the sleeve member 34 of the bearing hub 32 are of relatively short axial length, and their effectiveness to stabilize the swing frame 6 against toeing in and out and against lateral tilting is relatively small. However, the opposite side surfaces of the disk member 41, the thrust washers 39 and 43, the flange portion 36, and the side plate 14 of the swing frame 6 cooperate not only to retain the swing frame 6 against axial inward and outward displacement relative to the axle housing but also to greatly increase the stability of the track frame against toeing in and out and against lateral tilting. The combined stabilizing action of the journal bearing comprising the bushing 31 and sleeve 34, and of the thrust bearing comprising the disk member 41, thrust washers 39, 43, flange member 36 and side plate 14, is sufficient to take up all lateral thrust loads to which the swing frame may become subjected in operation of the vehicle, and which may tend to cause toeing in or out or lateral tilting of the swing frame relative to the axle housing. Accordingly, additional bracing means, such as a diagonal brace between the axle housing and the swing frame, which have heretofore been employed, are dispensed with in the herein disclosed axle housing and swing frame assembly.

The drive chains 26 and 28 within the hollow swing frame are accessible through top apertures which are normally closed by covers 48 and 49, and through a side aperture 51 (Fig. 3) in the side wall 16 which is normally closed by a cover 52. The side aperture 51 also affords access to a nut 53 and washer 55 on the axially outer end of the drive shaft 7 and by means of which the double sprocket wheel 24 is releasably retained on the drive shaft 7.

If it is desired to disconnect the swing frame 6 from the axle housing, the drive chains 26 and 28 may be opened up, and in order to release the swing frame for subsequent axial withdrawal from the axle housing it is only necessary to unscrew the cap screws 33 whose heads are accessible exteriorly of the swing frame 6 at the axially inner side of the bearing hub 32. As shown in Fig. 3, the swing frame has a side aperture 54 in the wall plate 14 opposite to the side aperture 51, and the side aperture 54 is large enough to permit lateral movement of the swing frame 6 away from the axle housing without interference with the double sprocket wheel 24, after the drive chains 26 and 28 have been opened up and the cap screws 33 have been unscrewed from the inner side wall 14. After the swing frame has been removed, the cap screws 42 may be unscrewed from the side arm 2, and this will release the drive shaft 7, bearing 46, and disk 41 for axial withdrawal from the axle housing, the splined axially inner end of the drive shaft 7 sliding out of the quill shaft 8 during such axial withdrawal, as will be readily apparent from Fig. 1.

After the disk 41 has been removed from the axle housing, the bearing hub 32 may readily be withdrawn from the bearing bushing 31.

In order to mount the swing frame on the axle housing, the bearing hub 32 may first be installed on the bearing bushing 31, and the disk member 41 and the drive shaft 7 may then be secured in place by means of the cap screws 42. The swing frame may then be moved laterally over the double sprocket 24 into the position in which it is shown in Figs. 1 and 3, and displacement of the swing frame in an axially inward direction relative to the axle housing is limited by engagement of an abutment on the swing frame, as represented by the thrust washer 43, with the axially outer side of the disk member 41. The cap screws 33, which represent detachable fastening means for securing the swing frame in rigidly connected relation to the bearing hub 32, may be installed as shown in Fig. 3 after the swing frame has been moved over the double sprocket 24, and in the assembled condition of the parts as shown in Fig. 3, the disk member 41 is abuttable at one side thereof with the bearing element which is represented by the bearing hub 32 and its associated thrust washer 39, to limit displacement of said bearing element axially of the axle housing in one direction. The portion of the side plate 14 of the swing frame, which surrounds the side aperture 54 and the associated thrust washer 43 represent thrust transmitting means which are cooperable with the disk member 41 at the other side of the latter to limit displacement of the bearing elements 32, 39 and of the swing frame 6 axially of the axle housing in the other direction. The thickness and the number of shims 44 between the bearing element 32 and the side plate 14 of the swing frame is such that the flat marginal portion of the disk member 41 and the thrust washers 39 and 43 will be closely fitted between the radial flange member 36 of the bearing hub 32 and the side plate 14 of the swing frame after the cap screws 32 have been tightened up. By removing some of the shims or installing additional shims, the thrust bearing comprising the disk member 41, thrust washers 39, 43, flange member 36 and side plate 14, may be readily adjusted to its proper working condition in which it permits vertical oscillation of the swing frame 6 on the axle housing without objectionable binding, and in which it assists the journal bearing comprising the bearing sleeve 31 and the sleeve member 34 in stabilizing the swing frame against toeing in and out and against lateral tilting relative to the axle housing, as has been explained hereinbefore.

It will be noted that the radially inner portion of the disk member 41 projects radially inwardly beyond the sleeve member 34 of the bearing element 32 and beyond the side aperture 54 of the swing frame, and that the cap screws 42 which represent bolt means for securing the disk member 41 in axially separable relation to the axle housing extend axially through said radially inwardly projecting portion of the disk member 41.

If it is desired to remove the double sprocket 24 for purposes of inspection or replacement, this can readily be accomplished without dismounting the swing frame from the axle housing, it being only necessary to remove the cover 52 from the side aperture 51 in the side plate 16 of the swing frame in order to expose the retaining nut 53 and washer 55 for the double sprocket wheel 24. After the drive chains 26 and 28 have been opened up and the retaining nut 53 has been unscrewed from the drive shaft 7, the washer 55 and the double sprocket wheel 24 may be axially withdrawn from the drive shaft 7 through the side aperture 51 of the swing frame.

In general terms, the disk member 41 represents an annular element which is connected with the axle housing and forms a radially outward extending end flange at one of the lateral extremities of the latter. The bearing hub 32 provides radial and axial load transmitting bearing elements on the swing frame 6 in cooperative relation, respectively, with a complementary radial load transmitting bearing element 31 on the axle housing, and with the axially inner side of the end flange 41; and the side plate 14 of the swing frame 6 provides an axial load transmitting bearing element on the swing frame in cooperative relation with the axially outer side of the end flange 41.

The bearing hub 32 as a whole represents an annular bearing element on the swing frame 6, having an axially extending sleeve member 34 and a radially enlarged portion 36 integrally formed with said sleeve member and affording a vertically extending annular bearing surface in axially confronting relation to one of the axially opposite sides of the end flange 41. On the other hand, the side plate 14 of the swing frame 6 affords another vertical annular bearing surface on the swing frame in axially confronting relation to the other of the axially opposite sides of the end flange 41. A peripheral portion of the bearing element 32, as represented by the portion 37 thereof, is arranged in encircling relation to the end flange 41.

The bearing bushing 31, considered as part of the hollow side arm 2, represents an axially extending cylindrical portion at the axially outer end of said side arm, and considering the disk member 41 as another part of said side arm, the latter terminates in a radially outward extending end flange at the axially outer end of the cylindrical portion 31, and the drive shaft 7 is surrounded intermediate its ends by the end flange 41.

The cap screws 42 which represent means for detachably securing the disk member 41 to the axle housing, are associated with radially inner portions of the side arm 2 and of the disk member 41, so that the annular bearing element 32 may be withdrawn in an axially outward direction from the cylindrical portion 31 of the side arm 2 upon detachment of the disk member 41 from the latter. The supporting bearing 46 for the drive shaft 7 is mounted on the disk member 41 for removal therewith from the side arm 2.

The cap screws 33 and shims 44 represent adjustable connecting means between the bearing element 32 and swing frame 6 which are operable to adjust the axial spacing between the vertical annular bearing surface which is afforded by the radially enlarged portion 36 of the bearing element 32, and the other annular bearing surface which is afforded by the side plate 14 of the swing frame.

It should be understood that it is not intended to limit the invention to the hereinabove described forms and details, and that the invention includes such other forms and modifications as are embraced by the scope of the appended claims.

It is claimed and desired to secure by Letters Patent:

1. In a motor vehicle having an axle housing and a rotatable drive shaft projecting axially from one of the lateral extremities of said axle housing, the combination of a centrally apertured disk member constructed as a separate part for attachment in radially outward extending relation to said axle housing, detachable fastening means at said one lateral extremity of said axle housing for securing said disk member in said radially outward extending and in axially fixed relation to said axle housing, a wheel supported swing frame, and means for operatively mounting said swing frame on said axle housing and for stabilizing said swing frame against toeing in and out and against lateral tilting relative to said axle housing independently of said drive shaft, said means comprising a bearing element having radial and axial load transmitting bearing surfaces in cooperative relation, respectively, with a complementary radial load transmitting bearing surface on said axle housing and with the axially inner side of said disk member, means detachably securing said bearing element to said swing frame, and an axial load transmitting bearing element on said swing frame in cooperative relation with the axially outer side of said disk member.

2. In a motor vehicle having an axle housing and a rotatable drive shaft projecting axially from one of the lateral extremities of said axle housing, the combination of a centrally apertured disk member constructed as a separate part for attachment in radially outward extending relation to said axle housing, detachable fastening means at said one lateral extremity of said axle housing for securing said disk member in said radially outward extending and in axially fixed relation to said axle housing, a wheel supported swing frame, and means for operatively mounting said swing frame on said axle housing and for stabilizing said swing frame against toeing in and out and against lateral tilting relative to said axle housing independently of said drive shaft, said means comprising an annular bearing element having an axially extending sleeve member, complementary bearing means on said axle housing in radial load transmitting relation with said sleeve member, a radially enlarged portion of said annular bearing element integrally formed with said sleeve member and affording a vertically extending annular bearing surface in axially confronting relation to one of the axially opposite sides of said disk member, means detachably securing said bearing element to said swing frame, and means affording a vertical annular bearing surface on said swing frame in axially confronting relation to the other of the axially opposite sides of said disk member.

3. In a motor vehicle, the combination of an axle housing having a hollow side arm, said side arm having an axially extending cylindrical portion at its axially outer end, a centrally apertured disk member constructed as a separate part for attachment in radially outward extending relation to the axially outer end of said cylindrical portion of said side arm, detachable fastening means at said axially outer end of said cylindrical portion of said side arm for securing said disk member in said radially outward extending relation and in axially fixed relation to said side arm, drive means including a rotatable drive shaft surrounded intermediate its ends by said disk member, a wheel supported swing frame, and means for operatively mounting said swing frame on said axle housing and for stabilizing said swing frame against toeing in and out and against lateral tilting relative to said axle housing independently of said drive shaft, said means comprising a bearing element having a radially inner cylindrical bearing surface in cooperative engagement with a radially outer bearing surface of said cylindrical portion of said side arm, said bearing element further having a radially enlarged portion affording a vertical annular bearing surface in axially confronting relation to said axially inner side of said end flange, means detachably securing said bearing element to said swing frame, and means affording another vertical annular bearing surface on said swing frame in axially confronting relation to said axially outer side of said disk member.

4. The combination of elements as set forth in claim 3, in which said cylindrical portion of said hollow side arm has axially extending tapped apertures at its axially outer end, and in which said detachable fastening means comprise bolt elements extending through said disk member and threaded into said apertures.

5. The combination of elements as set forth in claim 3, and further comprising a supporting bearing for said drive shaft mounted on said disk member for removal therewith from said side arm.

6. The combination of elements as set forth in claim 3, and further comprising means for adjusting the axial spacing between the vertical annular bearing surface afforded by said radially enlarged portion of said bearing element, and said other vertical annular bearing surface on said swing frame.

7. The combination of elements as set forth in claim 3, in which said bearing element comprises a sleeve member affording said radially inner cylindrical bearing surface, a radial flange member at one end of said sleeve member, affording said vertical annular bearing surface in axially confronting relation to said axially inner side of said disk member, and a peripheral portion extending axially from said radial flange member in encircling relation to said disk member.

8. The combination of elements as set forth in claim 7, and further comprising a thrust washer in cooperative rotatively loose relation with the axially inner side of said disk member and in cooperative rotatively loose relation with said vertical annular bearing surface of said bearing element, and another thrust washer in cooperative rotatively loose relation with the axially outer side of said disk member and in cooperative rotatively loose relation with said other vertical annular bearing surface on said swing frame.

CHESTER P. LELITER.

REFERENCES CITED

The following references are of record in the file of this patent:

UNITED STATES PATENTS

| Number | Name | Date |
|---|---|---|
| 1,830,400 | Midboe | Nov. 3, 1931 |
| 2,280,741 | Bolster et al. | Apr. 21, 1942 |
| 2,362,068 | Hollmann et al. | Nov. 7, 1944 |